US012412035B2

(12) United States Patent
Wagner et al.

(10) Patent No.: US 12,412,035 B2
(45) Date of Patent: *Sep. 9, 2025

(54) TOKEN PACKING FOR SEQUENCE MODELS

(71) Applicant: Microsoft Technology Licensing, LLC, Redmond, WA (US)

(72) Inventors: Andy Wagner, Cupertino, CA (US); Tiyasa Mitra, San Jose, CA (US); Marc Tremblay, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/431,180

(22) Filed: Feb. 2, 2024

(65) Prior Publication Data

US 2024/0176953 A1 May 30, 2024

Related U.S. Application Data

(63) Continuation of application No. 16/881,995, filed on May 22, 2020, now Pat. No. 11,928,429.

(51) Int. Cl.
*G06F 40/284* (2020.01)
*G06N 3/044* (2023.01)
*G06N 3/045* (2023.01)
*G06N 3/08* (2023.01)
*G06N 20/00* (2019.01)
*G10L 15/06* (2013.01)

(52) U.S. Cl.
CPC .......... *G06F 40/284* (2020.01); *G06N 3/044* (2023.01); *G06N 3/045* (2023.01); *G06N 3/08* (2013.01); *G06N 20/00* (2019.01); *G10L 15/063* (2013.01)

(58) Field of Classification Search
None
See application file for complete search history.

(56) References Cited

U.S. PATENT DOCUMENTS

| 7,039,579 B2 * | 5/2006 | Epstein ................. G10L 15/197 |
| | | 704/9 |
| 2020/0035224 A1 * | 1/2020 | Ward ...................... G10L 15/22 |
| 2020/0227032 A1 * | 7/2020 | Toplyn ................... G06F 40/56 |
| 2021/0012199 A1 * | 1/2021 | Zhang ...................... G06N 7/01 |
| 2021/0141798 A1 * | 5/2021 | Steedman Henderson .................. |
| | | G06F 16/3344 |
| 2021/0312294 A1 * | 10/2021 | Kurata .................... G06F 18/24 |

(Continued)

OTHER PUBLICATIONS

Devlin, J., Chang, M. W., Lee, K., & Toutanova, K. (2018). Bert: Pre-training of deep bidirectional transformers for language understanding. arXiv preprint arXiv: 1810.04805. 2019 (Year: 2019).*

*Primary Examiner* — Jonathan C Kim
(74) *Attorney, Agent, or Firm* — Holzer Patel Drennan

(57) ABSTRACT

Embodiments of the present disclosure include systems and methods for packing tokens to train sequence models. In some embodiments, a plurality of datasets for training a sequence model is received. Each dataset in the plurality of datasets includes a sequence of correlated tokens. A set of training data is generated that includes a subset of a sequence of tokens from a first dataset in the plurality of datasets and a subset of a sequence of tokens from a second, different dataset in the plurality of datasets. The sequence model is trained using the set of training data.

14 Claims, 11 Drawing Sheets

| | | | | | | | | | | | | | | |
|---|---|---|---|---|---|---|---|---|---|---|---|---|---|---|
| TOKENS 505 | The | Cat | Sat | The | Cat | Sat | The | Cat | Sat | The | Cat | Sat | The | Cat |
| TOKENS 510 | The | Dog | Laid | The | Dog | Laid | The | Dog | Laid | The | Dog | Laid | The | Dog |
| POSITION VALUES 515 | 0 | 1 | 2 | 3 | 4 | 5 | 6 | 7 | 8 | 9 | 10 | 11 | 12 | 13 |
| SENTENCE VALUES 520 | 0 | 0 | 0 | 0 | 0 | 0 | 0 | 0 | 0 | 0 | 0 | 0 | 0 | 0 |

(56) References Cited

U.S. PATENT DOCUMENTS

| | | | | |
|---|---|---|---|---|
| 2021/0319288 A1* | 10/2021 | Wagner | ............... | G06F 40/289 |
| 2021/0365633 A1* | 11/2021 | Wagner | ............... | G06N 20/00 |
| 2021/0365635 A1* | 11/2021 | Olabiyi | ............... | G06F 18/24 |
| 2021/0365723 A1* | 11/2021 | Wagner | ............... | G06N 20/00 |
| 2023/0259717 A1* | 8/2023 | Dang | ............... | G06F 40/166 |
| | | | | 704/9 |

* cited by examiner

| | | | | | | | | | | | | | |
|---|---|---|---|---|---|---|---|---|---|---|---|---|---|
| The | Cat | Sat | The | Dog | Laid | The | Cat | Sat | The | Dog | Laid | The | Cat |
| 0 | 1 | 2 | 3 | 4 | 5 | 6 | 7 | 8 | 9 | 10 | 11 | 12 | 13 |
| 0 | 0 | 0 | 1 | 1 | 1 | 0 | 0 | 0 | 1 | 1 | 1 | 0 | 0 |

TOKENS 405
POSITION VALUES 410
SENTENCE VALUES 415

| TOKENS 505 | The | Cat | Sat | The | Cat | Sat | The | Cat | Sat | The | Cat |
|---|---|---|---|---|---|---|---|---|---|---|---|
| TOKENS 510 | The | Dog | Laid | The | Dog | Laid | The | Dog | Laid | The | Dog |
| POSITION VALUES 515 | 0 | 1 | 2 | 3 | 4 | 5 | 6 | 7 | 8 | 9 | 10 | 11 | 12 | 13 |
| SENTENCE VALUES 520 | 0 | 0 | 0 | 0 | 0 | 0 | 0 | 0 | 0 | 0 | 0 |

*FIG. 5*

SEQUENCE OF TOKENS 705   JOHN RAN TOO FAST. HE FELL.
SEQUENCE OF TOKENS 710   JANE WENT HOME. SHE DID NOT FEEL WELL.
SEQUENCE OF TOKENS 715   THE CAR WAS ON THE LEFT.

*FIG. 7*

| TOKENS 805 | The | Car | Was | On | The | Left | John | Ran | Too | Fast |
|---|---|---|---|---|---|---|---|---|---|---|
| POSITION VALUES 815 | 0 | 1 | 2 | 3 | 4 | 5 | 6 | 7 | 8 | 9 |
| CORRELATION LABEL 820 | Not correlated |||||||||||

*FIG. 8*

| She | Did | Not | Feel | Well | Jane | Went | Home | He | Fell |
|---|---|---|---|---|---|---|---|---|---|
| 0 | 1 | 2 | 3 | 4 | 5 | 6 | 7 | 8 | 9 |
| Not correlated ||||||||||

TOKENS 905

POSITION VALUES 915

CORRELATION LABEL 920

TOKEN PACKING FOR SEQUENCE MODELS

CROSS REFERENCE TO RELATED APPLICATION

This application is a continuation of U.S. patent application Ser. No. 16/881,995, filed May 22, 2020, the entire contents of which are incorporated herein by reference in its entirety for all purposes.

BACKGROUND

The present disclosure relates to a computing system. More particularly, the present disclosure relates to techniques for training a neural network.

Natural-language understanding (NLU) is a subfield of natural-language processing (NLP) in artificial intelligence that addresses comprehension by computers of the structure and meaning of human language. NLU enables voice technology, search engines, and machine translation to deduce what a user means, regardless of the way it is expressed A neural network is a machine learning model that underpins NLU applications. A neural network is trained for a particular purpose by running datasets through it, comparing results from the neural network to known results, and updating the network based on the differences.

BRIEF DESCRIPTION OF THE DRAWINGS

Various embodiments of the present disclosure are illustrated by way of example and not limitation in the figures of the accompanying drawings.

FIG. 4 illustrates an example of training data that includes repeated tokens according to some embodiments.

FIG. 5 illustrates an example of training data that includes stacked tokens according to another embodiment.

FIG. 7 illustrates an example set of correlated sequences of tokens according to some embodiments.

FIG. 8 illustrates training data generated from the example set of correlated sequences of tokens illustrated in FIG. 6 according to some embodiments.

FIG. 9 illustrates another training data generated from the example set of correlated sequences of tokens illustrated in FIG. 6 according to some embodiments.

DETAILED DESCRIPTION

Figure 1:
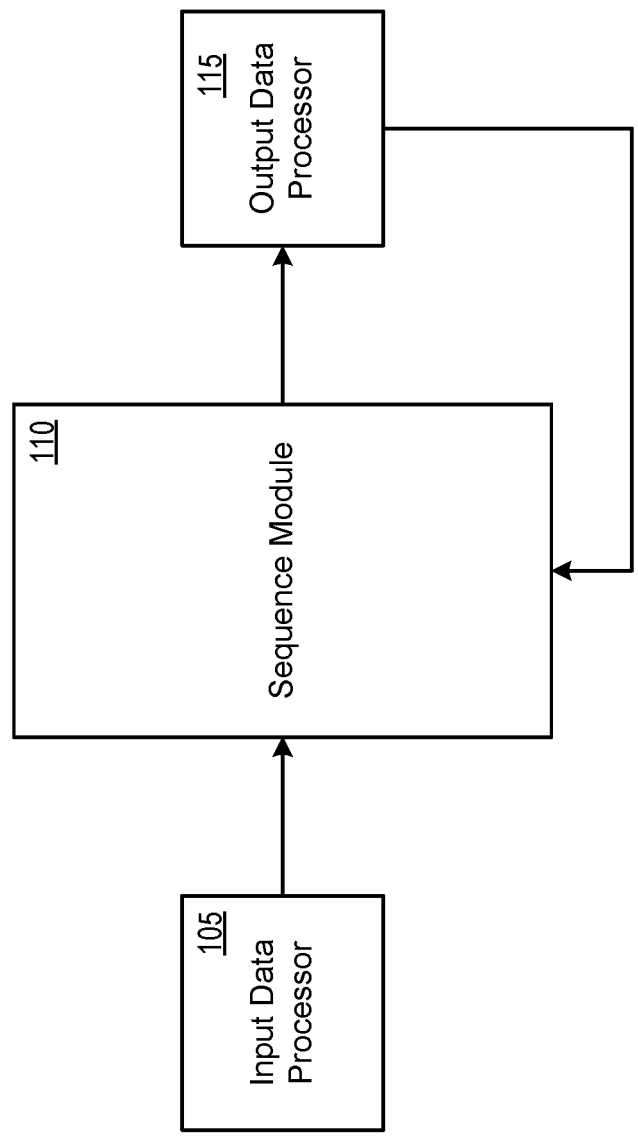
FIG. 1 illustrates a system for training a sequence model according to some embodiments.

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

Described here are techniques for packing tokens into input data used to train sequence models. In some embodiments, a system is used to perform a number of different token packing techniques. For example, the system can receive a set of input data that includes a sequence (e.g., a set of sentences) of tokens (e.g., words). The system may group the sequence of tokens into several groups of tokens (e.g., groups of words that form a sentence). Next, the system can generate input data for training a sequence model by packing a fixed length data structure with each group of tokens. With the remaining unused length left in the defined length of the data structure, the system continues packing the data structure with copies of the groups of words until the length of the data structure has been filled up with tokens.

As another example, the system may generate input data for training a sequence model by packing a first row of a fixed length data structure with a first group of tokens until the length of the first row of the data structure is filled up with tokens from the first group of tokens. Then, the system packs a second row of the fixed length data structure with a second group of tokens until the length of the second row of the data structure is filled up with tokens from the second group of tokens. The system continues to pack subsequent rows of the fixed length data structure with remaining groups of tokens in the same manner.

In another example, the set of input data that the system receives from several datasets (e.g., paragraphs of text, pages of text, documents of text, etc.) that each includes a sequence (e.g., a set of sentences) of correlated tokens. Tokens in the sequences of correlated tokens can be grouped (e.g., based on sentences) together based on their correlation. The input data that the system generates for training a sequence model includes different groups of tokens from different datasets based on the lengths of the different groups of tokens in order to optimally fill up fixed length data structures with groups of tokens.

The techniques described in the present application provide a number of benefits and advantages over conventional methods of training a sequence model. For instance, the various token packing techniques used to generate input data to train the sequence model can increase the speed at which weights of the sequence model reach convergence. In other words, using any of these techniques results in faster training of the sequence model.

FIG. 1 illustrates a system 100 for training a sequence model according to some embodiments. As shown, system 100 includes input data processor 105, sequence module 110, and output data processor 115. Input data processor 105 is configured to processor input data used for training sequence module 110. For example, input data processor 105 may receive a set of input data that includes a sequence (e.g., a set of sentences) of tokens (e.g., words) and position values for the sequence of tokens. In some embodiments, a position value represents the relative position of a particular token in a sequence of tokens. In some such embodiments, a set of input data can also include a set of sentence values. A sentence value may represent a sentence to which a token in the sequence of tokens belongs. The sentence value can also be used to determine correlations between sentences of words. For example, tokens in a first sentence can each have a sentence value of zero ("0") and tokens in a second sentence can each have a sentence value of one ("1"). These sentence values indicate that the second sentence follows the first sentence and the two sentences are thus correlated. In some embodiments, the sentence values may be set to a special defined value to indicate that sentences of words are not correlated.

After receiving the set of input data, input data processor 105 can use several different token packing techniques to generate training data for training sequence module 110. Details of token packing techniques are described further below. Once input data processor 105 finishes generating training data, input data processor 105 can add label data to the training data. The label data can include the actual next sequence of tokens and data indicating whether tokens in the sequence of tokens not correlated. Then, input data processor 105 sends the training data and label data to sequence module 110 for training.

Sequence module 110 is responsible for a next sequence of tokens for a given input sequence of tokens. In some embodiments, sequence module 110 includes a sequence model. Different types of neural networks may be used to implement the sequence model. For example, a transformer neural network (also referred to as a transformer or a transformer model) can be used. Examples of transformer models include a bidirectional encoder representations from transformers (BERT) model, a generative pre-training (GPT) model, a GPT-2 model, a robustly optimized BERT pretraining approach (ROBERTa) model, a distilled version of BERT (DistiliBERT) model, an XLNet model, etc.

A transformer neural network has a sequence-to-sequence architecture. That is, the transformer neural network can transforms a given sequence of elements, such as the sequence of words in a sentence, into another sequence. In some embodiments, the transformer neural network includes weights used for predicting the next sequence of tokens. The transformer neural network can adjust these weights based on feedback (e.g., differences between a predicted next sequence of tokens and the actual next sequence of tokens) received from output data processor 115 using a back propagation technique. Another type of neural networks that may be utilized is a recurrent neural network (RNN).

Sequence module 110 may determine relationships/correlations between tokens in input data. For instance, sequence module 110 can process tokens in relation to all the other tokens in a sequence, instead of one-by-one in order. In other words, sequence module 110 considers the full context of a token by looking at the tokens that come before and after it. Sequence module 110 may be used for machine translation and search (e.g., conversational queries). Other applications of sequence module 110 include: document summarization, document generation, named entity recognition (NER), speech recognition, and biological sequence analysis.

When sequence module 110 receives training data from input data processor 105, sequence module 110 can determine token embeddings for each token in the sequence of tokens using an embedding space generated from a corpus of tokens (e.g., a vocabulary of words). In some embodiments, a token embedding space maps tokens in the corpus, which has many dimension, to numeric representations (e.g., vectors) having a lower number of dimensions. The numeric representation of a token can be a vector of 128, 256, 1024, 2048, 4096, etc. floating-point numbers. Then, sequence module 110 can determine position embeddings for each unmasked position value in the set of position values using an embedding space generated from a corpus of position values. In some embodiments, a position value embedding space maps position values in the corpus, which has many dimension, to numeric representations (e.g., vectors) having a lower number of dimensions. The numeric representation of a position value can be a vector of 128, 256, 1024, 2048, 4096, etc. floating-point numbers. In cases where the input data includes sentence values, input data processor 105 may determine sentence embeddings for each sentence value in the set of sentence values using an embedding space generated from a corpus of sentence values. In some embodiments, a sentence value embedding space maps sentence values in the corpus, which has many dimension, to numeric representations (e.g., vectors) having a lower number of dimensions. The numeric representation of a sentence value can be a vector of 128, 256, 1024, 2048, 4096, etc. floating-point numbers. After determining embeddings for tokens, position values, and/or sentence values, sequence module 110 calculates an aggregate embedding for each token in the sequence of tokens by adding the token embedding, the corresponding position value embedding, and/or the corresponding sentence value embedding together. Sequence module 110 then uses the aggregate embeddings for training.

Output data processor 115 is configured to process data output from sequence module 110. For example, output data processor 115 can receive an array of data from sequence module 110 and label data. The array of data may include a numeric representation (e.g., the aggregate embedding described above) for each token in a sequence of tokens used as input to sequence module 110. The label data can include the actual next sequence of tokens and data indicating whether tokens in the sequence of tokens not correlated. Next, output data processor 115 determines the predicted sequence of tokens. Output data processor 115 then determines the differences between the predicted sequence of tokens and the actual next sequence tokens specified in the label data. Also, output data processor 115 determines the differences between the predicted correlation between tokens in the sequence of tokens and the actual correlation between tokens in the sequence of tokens specified in the label data. Finally, output data processor 115 sends the calculated differences back to sequence module 110 to adjust the weights of sequence module 110.

Figure 2:
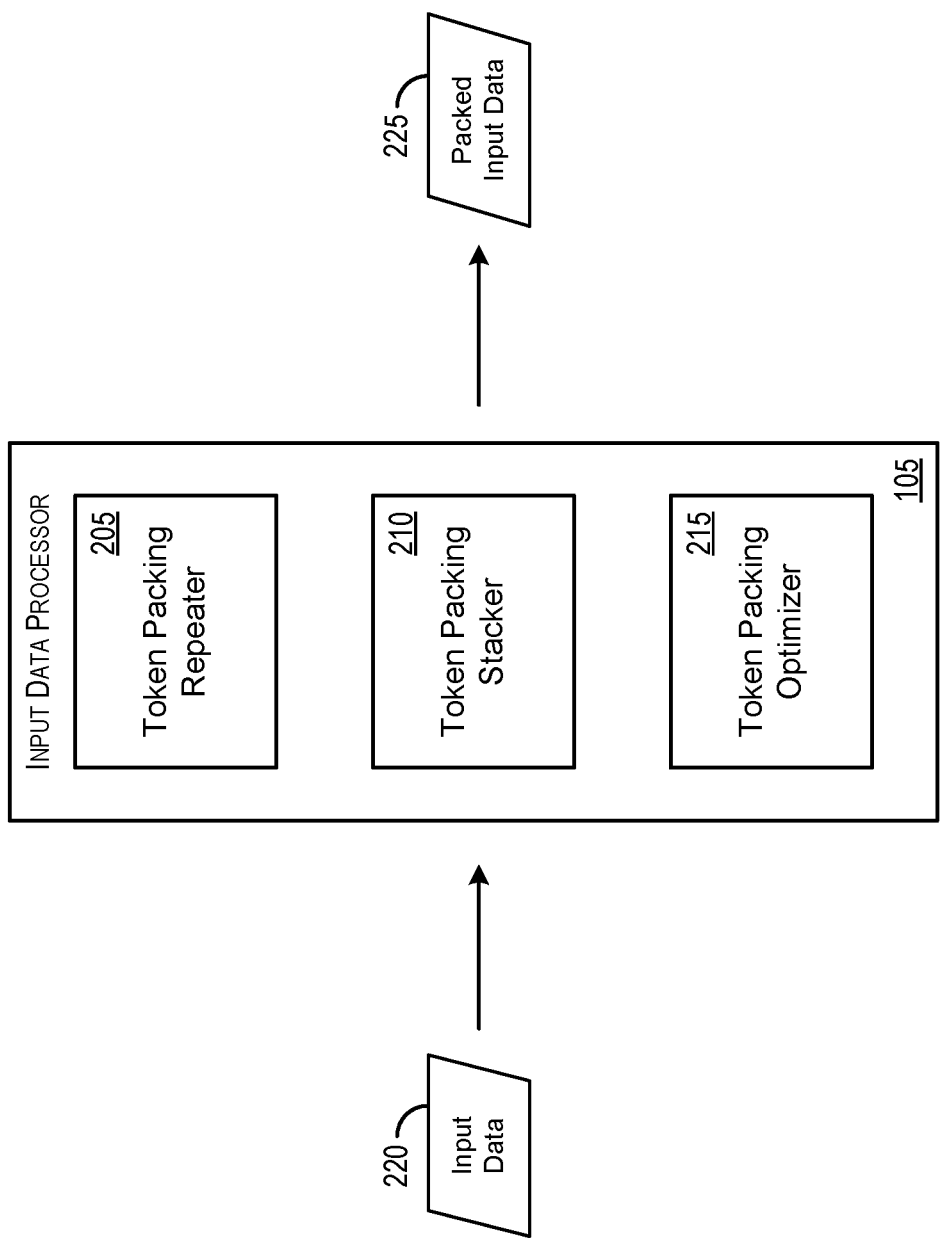
FIG. 2 illustrates an architecture of the input data processor illustrated in FIG. 1 according to some embodiments.

FIG. 2 illustrates an architecture of input data processor 105 according to some embodiments. As shown, input data processor 105 includes token packing repeater 205, token packing stacker 210, and token packing optimizer 215. As shown, input data processor 105 receives input data 220. Input data processor 105 may be configured to use either token packing repeater 205, token packing stacker 210, or token packing optimizer 215 to process input data 220. That is, only one component of input data processor 105 can be used to process a given input data.

Figure 3:
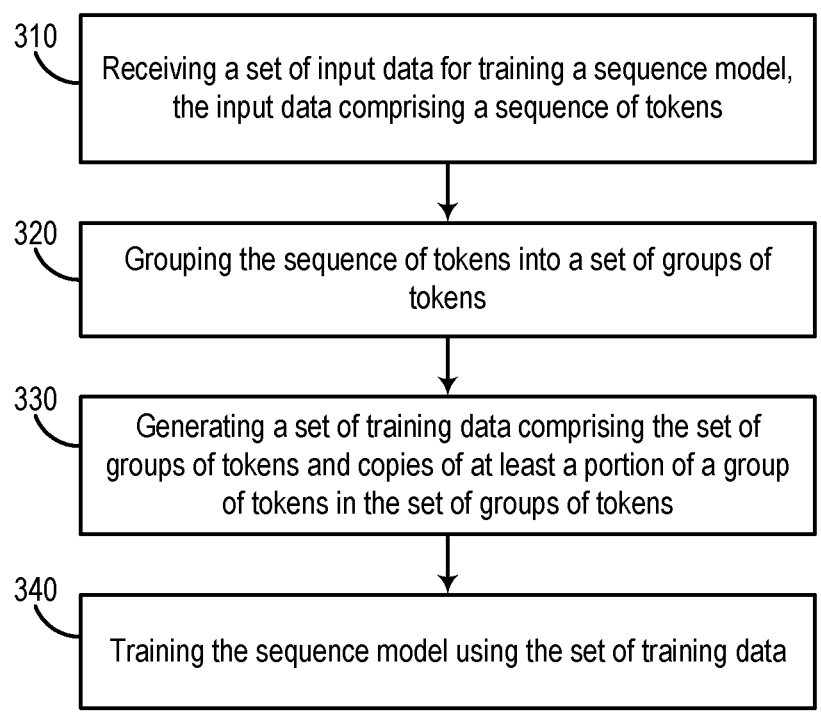
FIG. 3 illustrates a process for a repeating token packing technique according to some embodiments.

Token packing repeater 205 is configured to generate training data using a repeating token packing technique. An example of this technique will be described by reference to FIGS. 3 and 4. FIG. 3 illustrates a process 300 for a repeating token packing technique according to some embodiments. In some embodiments, system 100 performs process 300. Process 300 begins by receiving, at 310, a set of input data for training a sequence model. The input data includes a sequence of tokens. For example, token packing repeater 205 can receive input data 220. For this example, input data includes a sequence that includes two sentences: "The cat sat." and "The dog laid."

Next, process 300, groups, at 320, the sequence of tokens into a set of groups of tokens. For example, token packing repeater 205 can group the sequence of tokens into the set of groups of tokens. In some embodiments, process 300 groups the sequence of tokens into groups of tokens according to sentences. Using the example sequence above, process 300 groups the sequence of tokens into two groups. The first group of tokens is the first sentence, "The cat sat," and the second group of tokens is the second sentence, "The dog laid."

Process 300 then generates, at 330, a set of training data that includes the set of groups of tokens and copies of at least a portion of a group of tokens in the set of groups of tokens. For example, token packing repeater 205 may generate the set of training data. In some embodiments, the set of training data that process 300 generates includes a data structure (e.g., an array) having a defined length (e.g., length of tokens). In some such embodiments, process 300 packs the data structure with the each group of tokens. Then, process 300 packs the remaining unused length of the data structure with repeated copies of the groups of tokens until the data structure is filled up with tokens.

FIG. 4 illustrates an example of training data 400 that includes repeated tokens according to some embodiments. Specifically, training data 400 is training data that process 300 generates using the example sequence of tokens above. As shown, training data 400 is a data structure (e.g., an array) that includes tokens 405, position values 410, and sentence values 415. As mentioned above, a position value can represent the relative position of a particular token in a sequence of tokens and a sentence value can represent a sentence to which a token in the sequence of tokens belongs. In this example, the data structure that process 300 generates for the training data has a defined length of fourteen. That is, the data structure is configured to store fourteen tokens. As shown, process 300 packs the first three tokens of tokens 405 with each word in the first sentence ("The cat sat."). Then, process 300 packs the next three tokens in tokens 405 with each word in the second sentence ("The dog laid"). Next, process 300 repeatedly packs tokens 405 with copies of the first sentence followed by the second sentence followed by the first sentence and so on and so forth until the fourteen spaces in tokens 405 is filled up. Returning to FIG. 3, process 300 finally trains, at 340, the sequence model using the set of training data. For example, training data 400 is used to train sequence module 110.

Token packing stacker 210 serves to generate training data using a stacking token packing technique. Similar to token packing repeater 205, when token packing stacker 210 receives input data to process (e.g., input data 220), token packing stacker 210 groups the sequence of tokens into a set of groups of tokens. In some embodiments, token packing stacker 210 groups the sequence of tokens into groups of tokens according to sentences. Using the example sequence of tokens above, token packing stacker 210 groups the sequence of tokens into two groups. The first group of tokens is the first sentence, "The cat sat," and the second group of tokens is the second sentence, "The dog laid."

Next, token packing stacker 210 generates a set of training data that includes a data structure (e.g., an array) having a defined length (e.g., length of tokens). For each group of tokens, the data structure has a row to store tokens. Token packing stacker 210 then iterates through each group of tokens, stores the group of tokens, and repeatedly stores copies of the group of tokens in the respective row of the data structure until the row is filled up with tokens. Using the example groups of tokens above, token packing stacker 210 would generate a set of training data that includes a data structure that has two rows for storing tokens. A first row is used to store tokens in the first group of tokens and a second row is used to store tokens in the second group of tokens.

FIG. 5 illustrates an example of training data 500 that includes stacked tokens according to another embodiment. In particular, training data 500 is training data that token packing stacker 210 generates using the example sequence of tokens above. As shown, training data 500 is a data structure (e.g., an array) that includes tokens 505, tokens, 510, position values 515, and sentence values 520. For this example, the data structure that token packing stacker 210 generates for the training data has a defined length of fourteen. In other words, the data structure is configured to store fourteen tokens. As shown in FIG. 5, the first row, tokens 505, is for storing tokens in the first sentence and the second row, tokens 510, is for storing tokens in the second sentence. Here, token packing stacker 210 stores each word in the first sentence, "The cat sat," in tokens 505 and then repeatedly stores copies of the first sentence in tokens 505 until tokens 505 is filled up with tokens. Similarly, token packing stacker 210 stores each word in the second sentence, "The dog laid," in tokens 510 and then repeatedly stores copies of the second sentence in tokens 510 until tokens 510 is filled up with tokens.

Figure 6:
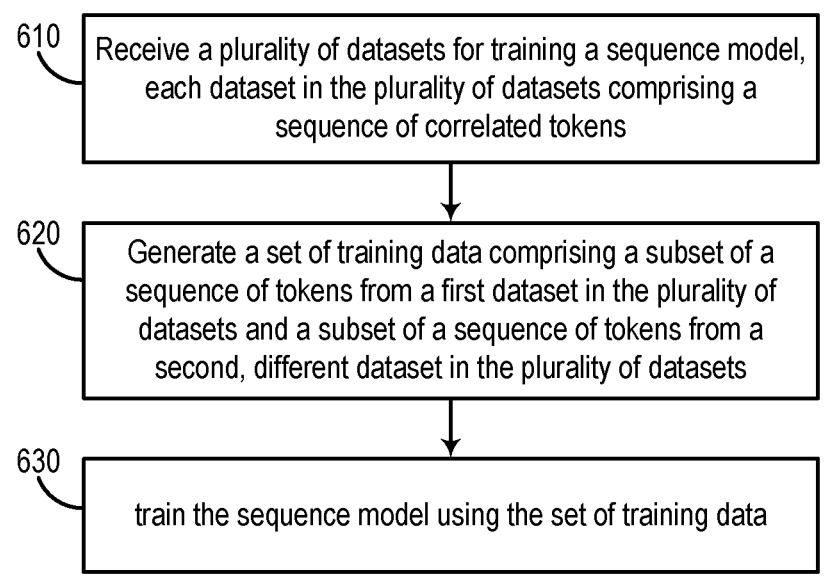
FIG. 6 illustrates a process for an optimized token packing technique according to some embodiments.

Returning to FIG. 2, token packing optimizer 215 is configured to generate training data using an optimizing token packing technique. An example of such a technique will be described by reference to FIGS. 6-9. FIG. 6 illustrates a process 600 for an optimized token packing technique according to some embodiments. In some embodiments, system 100 performs process 600. Process 600 begins by receiving, at 610, a plurality of datasets for training a sequence model. Each dataset in the plurality of datasets includes a sequence of correlated tokens. For example, token packing optimizer 215 can receive input data 220. FIG. 7 illustrates an example set of correlated sequences of tokens 705-715 according to some embodiments. In this example, each of the sequences of tokens 705-715 is a separate paragraph of text that represents a dataset. That is, sequence of tokens 705 is a first paragraph of text that represents a first dataset, sequence of tokens is a second paragraph of text that represents a second dataset, and sequence of tokens 715 is a third paragraph of text that represents a third dataset. Thus, on a paragraph to paragraph basis, the sentences within each of the sequence of tokens 705-715 are correlated and sentences from different sequences of tokens 705-715 are not correlated.

Next, process 600 generates, at 620, a set of training data that includes a subset of a sequence of tokens from a first dataset in the plurality of datasets and a subset of a sequence of tokens from a second, different dataset in the plurality of datasets. For example, token packing repeater 205 can generate the set of training data. In some embodiments, process 600 generates a set of training data by determining, for the sequence of tokens of each dataset in the plurality of datasets, a set of groups of tokens in the sequence of tokens. In some embodiments, process 600 groups sentences as groups of tokens. Referring to FIG. 7 as an example, process 600 groups each sentence in sequence of tokens 705-715 as a separate group of tokens. Specifically, process 600 groups "John ran too fast" as a first group of tokens, "He fell" as a second group of tokens, "Jane went home" as a third group of tokens, "She did not feel well" as a fourth group of tokens, and "The car was on the left" as a fifth group of tokens. Next, process 600 may determine, for each group of tokens in the set of groups of tokens of each sequence of tokens, a length of the group of tokens. Referring to FIG. 7 as an example, process 600 determines the length of the first group of tokens as four, the length of the second group of tokens as two, the length of the third group of tokens as three, the length of the fourth group of tokens as five, and the length of the group of tokens as six.

In some embodiments, the set of training data that process 600 generates includes data structures (e.g., arrays) that each have a defined length (e.g., length of tokens). Process 600 may optimally packs such data structures with tokens from the plurality of datasets. For instance, in some embodiments, process 600 packs a data structure by identifying a group of tokens in the plurality of datasets having the longest length equal to or less than the defined length of the data structure. Process 600 iteratively packs the data structure with remaining groups of tokens in the plurality of datasets having the longest length that is equal to or less than the remaining length in the data structure. After a data structure is filled up with tokens, process 600 continues to generate a data structure and pack it in the same manner until there are no more groups of tokens left.

FIG. 8 illustrates training data 800 generated from the example set of correlated sequences of tokens illustrated in FIG. 6 according to some embodiments. In particular, training data 800 is the first data structure that process 600 generates based on the methodology described above. For this example, the data structures that process 600 generates for the training data has a defined length of ten. That is, the data structure is configured to store ten tokens. As shown, process 600 packs training data 800 by identifying group of tokens (sentences in this example) having the longest length that is equal to or less than the defined length of the data structure (ten in this example). Here, the sentence "The car was on the left" has the longest length that is less than the data structure defined length of ten. As such, process 600 fills training data 800 with the sentence. With a remaining, unused length of four, process 600 identifies a remaining group of tokens with the longest length that is equal to or less than four. For this example, the sentence "John ran too fast" has a length of four. Thus, process 600 fills training data 800 with the sentence.

Since training data 800 is filled up with groups of tokens, process 600 proceeds to generate another data structure with a length of ten to pack with remaining groups of tokens. FIG. 9 illustrates another training data 900 generated from the example set of correlated sequences of tokens illustrated in FIG. 6 according to some embodiments. In particular, training data 900 is the second data structure that process 600 generates based on the methodology described above. Process 600 packs training data 900 by identifying remaining groups of tokens having the longest length that is equal to or less than the defined length of the data structure. As illustrated in FIG. 9, process 600 starts by packing training data 900 with the sentence "She did not feel well" since it is the remaining sentence that has the longest length that is less than the data structure defined length of ten. With a remaining, unused length of five, process 600 identifies a remaining group of tokens with the longest length that is equal to or less than five. In this example, the sentence "Jane went home" has a length of three and hence, process 600 fills training data 900 with this sentence. Finally, with a remaining, unused length of two, process 600 identifies a remaining group of tokens with the longest length that is equal to or less than two. In this case, the last remaining sentence "He fell" has a length of two so process 600 fills training data 900 with this sentence. Returning to FIG. 6, process 600 then trains, at 630, the sequence model using the set of training data. For example, training data 800 and 900 are used to train sequence module 110.

Figure 10:
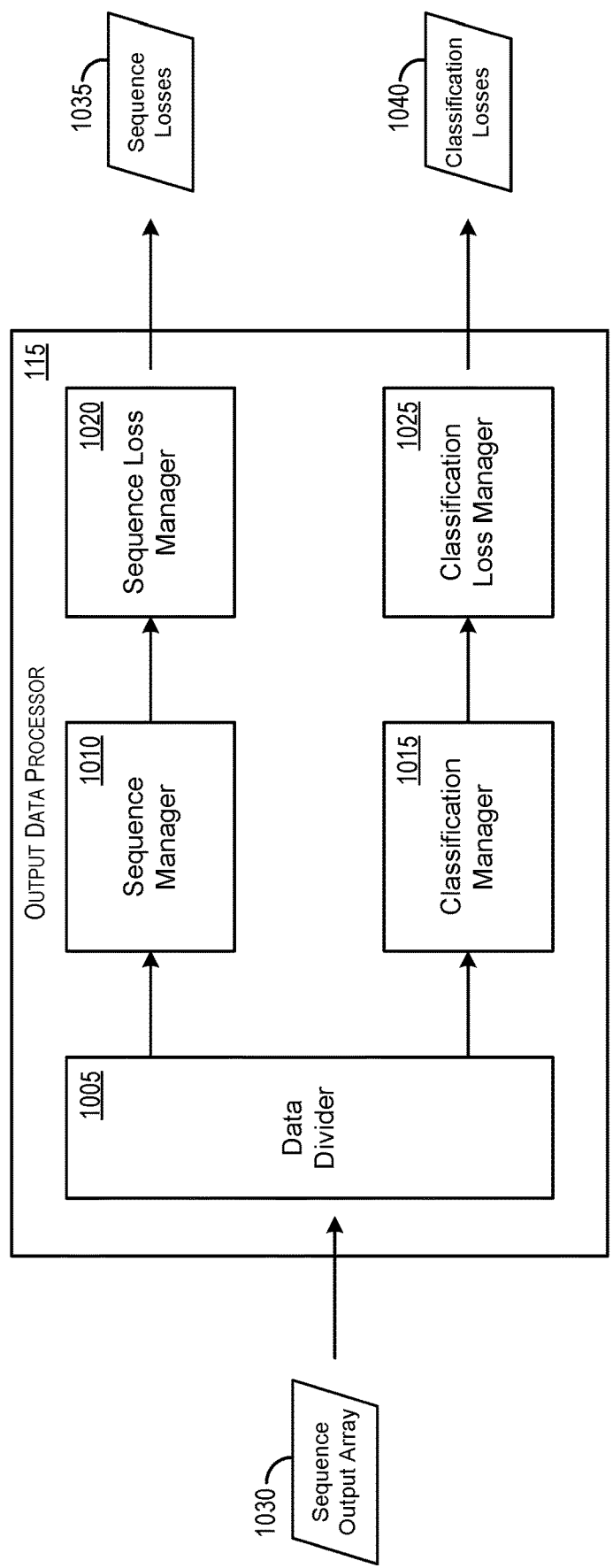
FIG. 10 illustrates an architecture of the output data processor illustrated in FIG. 1 according to some embodiments.

FIG. 10 illustrates an architecture of output data processor 115 according to some embodiments. As shown, output data processor 115 includes Data divider 1005, sequence manager 1010, classification manager 1015, sequence loss manager 1020, and classification loss manager 1025. Data divider 1005 is responsible for dividing data into sequences of tokens and correlation data. As shown in FIG. 10, data divider 1005 receives sequence output array 1030 as input. In response, data divider 1005 sends data in sequence output array 1030 associated with sequences of tokens to sequence manager 1010 and sends correlation data (e.g., data pertaining to sentence values) in sequence output array 1030 to classification manager 1015.

Sequence manager 1010 is configured to predict a next sequence of tokens for a given input sequence of tokens. For example, sequence manager 1010 can receive from data divider 1005 vector representations of a next sequence of tokens. Next, sequence manager 1010 performs a set of projection functions on the vector representations to determine probabilities associated with corpus of tokens (e.g., a vocabulary of words). For each token in the next sequence of tokens, sequence manager 1010 selects the token having the highest probability as being the token predicted for the token in the next sequence of tokens. After predicting tokens for the next sequence of tokens, sequence manager 1010 sends the predicted next sequence of tokens to sequence loss manager 1020.

Classification manager 1015 handles predictions of correlations between tokens. For instance, classification manager 1015 may receive correlation data (e.g., data associated with sentence values) from token divider 1005. Classification manager 1015 may perform a set of classification functions on the correlation data to determine probabilities associated with correlations between tokens and/or groups of tokens in the sequence of tokens. Based on the probabilities, classification manager 1015 predicts whether tokens and/or groups of tokens in the sequence of tokens are correlated with each other. Once classification manager 1015 finishes predicting correlations between tokens, classification manager 1015 sends the predicted correlations to classification loss manager 1025.

Sequence loss manager 1020 is responsible for determining sequence losses. For example, when sequence loss manager 1020 receives a predicted next sequence of tokens from sequence manager 1010, sequence loss manager 1020 calculates a difference (e.g., an error) between the predicted next sequence of tokens and the actual next sequence of tokens (e.g., stored in label data). The calculated difference is depicted in FIG. 10 as sequence losses 1035. Sequence manager 1020 may send token losses 1035 to sequence module 110, which sequence module 110 uses to adjust its weights.

Classification loss manager 1025 is configured to determine correlation losses. For instance, upon receiving predicted correlations from classification manager 1015, classification loss manager 1025 may calculate differences (e.g., errors) between the predicted correlations between tokens and the actual correlations between tokens (e.g., stored in label data). The calculated differences are depicted in FIG. 10 as classification losses 1040. Classification loss manager 1025 can send classification losses 1040 to sequence module 110, which sequence module 110 uses to adjust its weights.

Figure 11:
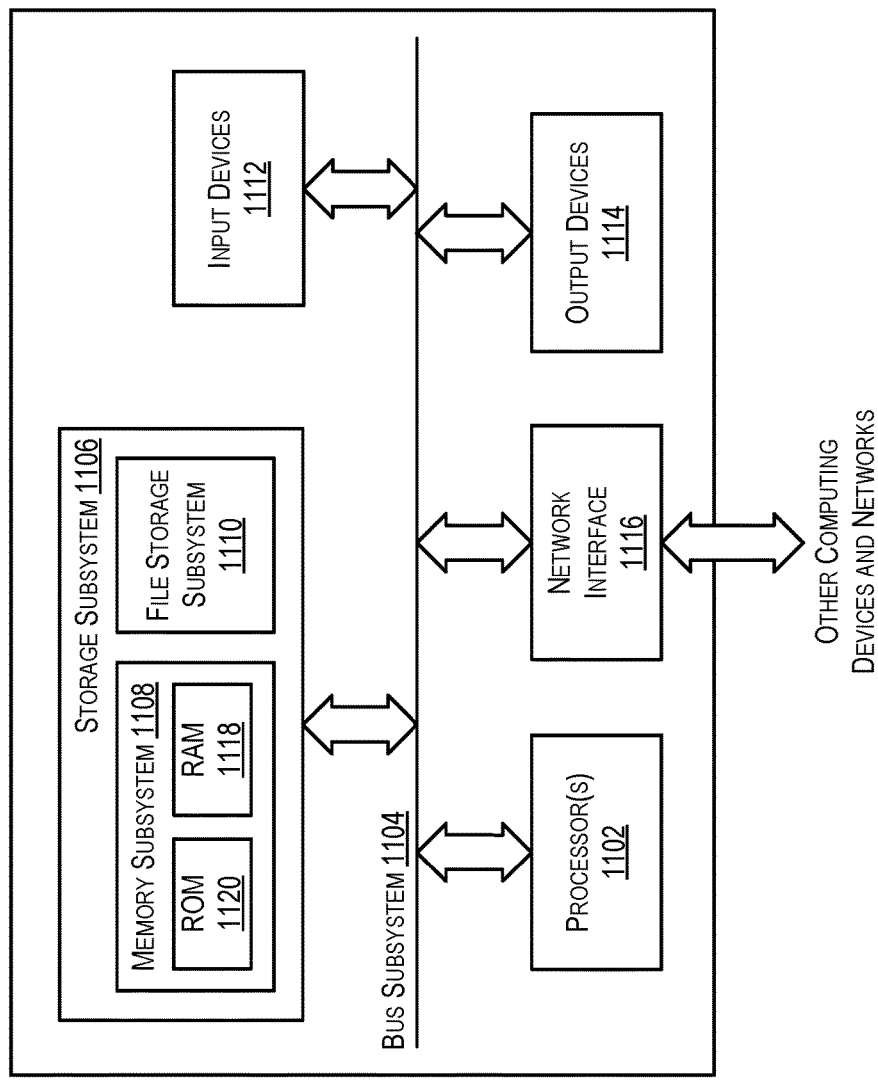
FIG. 11 depicts a simplified block diagram of an example computer system according to some embodiments.

The techniques describe above may be implemented in a wide range of computer systems configured to process neural networks. FIG. 11 depicts a simplified block diagram of an example computer system 1100, which can be used to implement the techniques described in the foregoing disclosure. In some embodiments, computer system 1100 may be used to implement system 100. As shown in FIG. 11, computer system 1100 includes one or more processors 1102 that communicate with a number of peripheral devices via a bus subsystem 1104. These peripheral devices may include a storage subsystem 1106 (e.g., comprising a memory subsystem 1108 and a file storage subsystem 1110) and a network interface subsystem 1116. Some computer systems may further include user interface input devices 1112 and/or user interface output devices 1114.

Bus subsystem 1104 can provide a mechanism for letting the various components and subsystems of computer system 1100 communicate with each other as intended. Although bus subsystem 1104 is shown schematically as a single bus, alternative embodiments of the bus subsystem can utilize multiple busses.

Network interface subsystem 1116 can serve as an interface for communicating data between computer system 1100 and other computer systems or networks. Embodiments of network interface subsystem 1116 can include, e.g., Ethernet, a Wi-Fi and/or cellular adapter, a modem (telephone, satellite, cable, ISDN, etc.), digital subscriber line (DSL) units, and/or the like.

Storage subsystem 1106 includes a memory subsystem 1108 and a file/disk storage subsystem 1110. Subsystems 1108 and 1110 as well as other memories described herein are examples of non-transitory computer-readable storage media that can store executable program code and/or data that provide the functionality of embodiments of the present disclosure.

Memory subsystem 1108 includes a number of memories including a main random access memory (RAM) 1118 for storage of instructions and data during program execution and a read-only memory (ROM) 1120 in which fixed instructions are stored. File storage subsystem 1110 can provide persistent (e.g., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 1100 is illustrative and many other configurations having more or fewer components than system 1100 are possible.

Figure 12:
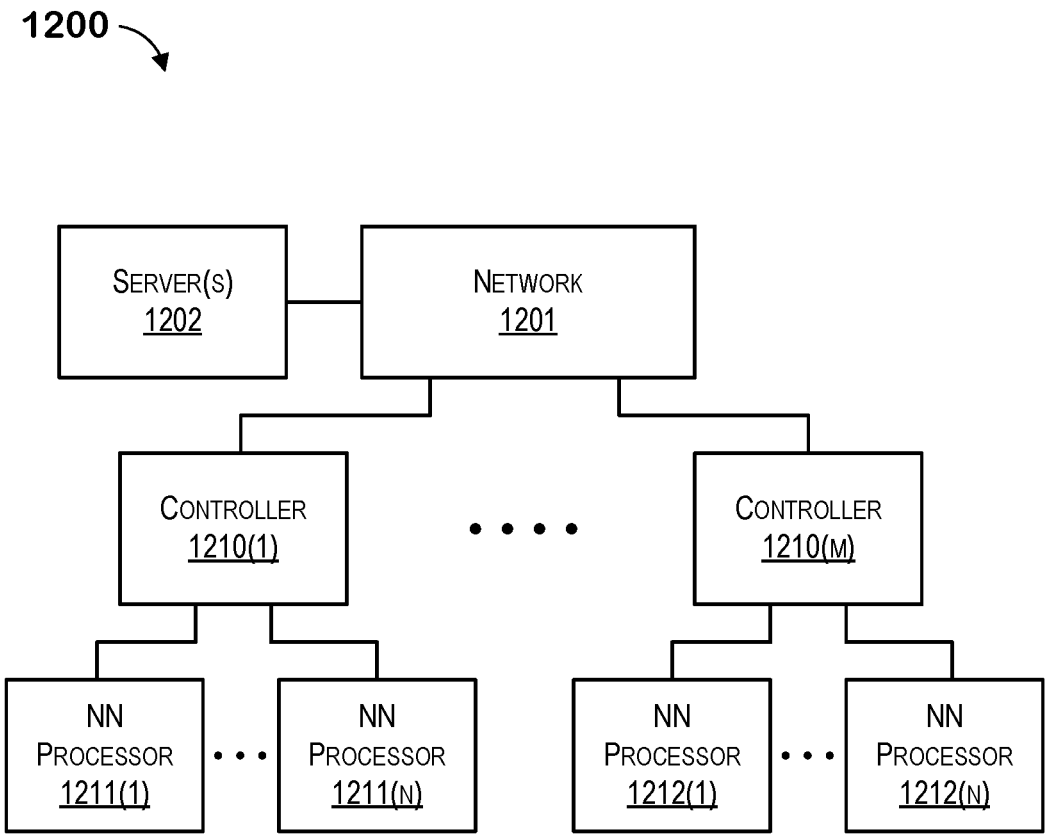
FIG. 12 illustrates a neural network processing system according to some embodiments.

FIG. 12 illustrates a neural network processing system according to some embodiments. In various embodiments, neural networks according to the present disclosure may be implemented and trained in a hardware environment comprising one or more neural network processors. A neural network processor may refer to various graphics processing units (GPU) (e.g., a GPU for processing neural networks produced by Nvidia Corp®), field programmable gate arrays (FPGA) (e.g., FPGAs for processing neural networks produced by Xilinx®), or a variety of application specific integrated circuits (ASICs) or neural network processors comprising hardware architectures optimized for neural network computations, for example. In this example environment, one or more servers 1202, which may comprise architectures illustrated in FIG. 11 above, may be coupled to a plurality of controllers 1210(1)-1210(M) over a communication network 1201 (e.g. switches, routers, etc.). Controllers 1210(1)-1210(M) may also comprise architectures illustrated in FIG. 11 above. Each controller 1210(1)-1210(M) may be coupled to one or more NN processors, such as processors 1211(1)-1211(N) and 1212(1)-1212(N), for example. NN processors 1211(1)-1211(N) and 1212(1)-1212(N) may include a variety of configurations of functional processing blocks and memory optimized for neural network processing, such as training or inference. The NN processors are optimized for neural network computations. Server 1202 may configure controllers 1210 with NN models as well as input data to the models, which may be loaded and executed by NN processors 1211(1)-1211(N) and 1212(1)-1212(N) in parallel, for example. Models may include layers and associated weights as described above, for example. NN processors may load the models and apply the inputs to produce output results. NN processors may also implement training algorithms described herein, for example.

Further Example Embodiments

In various embodiments, the present disclosure includes systems, methods, and apparatuses for packing tokens into input data used to train sequence models. The techniques described herein may be embodied in non-transitory machine-readable medium storing a program executable by a computer system, the program comprising sets of instructions for performing the techniques described herein. In some embodiments, a system includes a set of processing units and a non-transitory machine-readable medium storing instructions that when executed by at least one processing unit in the set of processing units cause the at least one processing unit to perform the techniques described above. In some embodiments, the non-transitory machine-readable medium may be memory, for example, which may be coupled to one or more controllers or one or more artificial intelligence processors, for example.

The following techniques may be embodied alone or in different combinations and may further be embodied with other techniques described herein.

For example, in one embodiment, the present disclosure includes a system comprising a set of processing units and a non-transitory machine-readable medium storing instructions that when executed by at least one processing unit in the set of processing units cause the at least one processing unit to receive a plurality of datasets for training a sequence model, each dataset in the plurality of datasets comprising a sequence of correlated tokens; generate a set of training data comprising a subset of a sequence of tokens from a first dataset in the plurality of datasets and a subset of a sequence of tokens from a second, different dataset in the plurality of datasets; and train the sequence model using the set of training data.

In one embodiment, generating the set of training data comprises determining, for the sequence of tokens of each dataset in the plurality of datasets, a set of groups of tokens in the sequence of tokens and determining, for each group of tokens in the set of groups of tokens of each sequence of tokens, a length of the group of tokens, wherein generating the set of training data is based on the lengths of the groups of tokens.

In one embodiment, the set of training data comprises a data structure having a defined length and generating the set of training data comprises identifying a group of tokens in the plurality of datasets having the longest length equal to or less than the defined length of the data structure; and packing the data structure with the identified group of tokens.

In one embodiment, generating the set of training data further comprises iteratively packing the data structure with remaining groups of tokens in the plurality of datasets having the longest length that is equal to or less than a remaining length in the data structure.

In one embodiment, the data structure is a first data structure, the set of training data further comprises a second data structure having the defined length, and generating the set of training data comprises identifying a remaining group of tokens in the plurality of datasets having the longest length equal to or less than the defined length of the data structure; and packing the second data structure with the identified group of tokens.

In one embodiment, generating the set of training data comprises adding label data to the set of training data indicating that the subset of the sequence of tokens from the first dataset and the subset of the sequence of tokens from the second, different dataset are not correlated.

In one embodiment, the sequence of correlated tokens in the first dataset is a first set of sentences from a first paragraph of text and the sequence of correlated tokens in the second dataset is a second set of sentences from a second paragraph of text.

In one embodiment, the present disclosure includes a system comprising a set of processing units and a non-transitory machine-readable medium storing instructions that when executed by at least one processing unit in the set of processing units cause the at least one processing unit to receive a set of input data for training a sequence model, the input data comprising a sequence of tokens; group the sequence of tokens into a set of groups of tokens; generate a set of training data comprising the set of groups of tokens and copies of at least a portion of a group of tokens in the set of groups of tokens; and train the sequence model using the set of training data.

In one embodiment, the copies of at least the portion of the group of tokens are copies of at least the portion of a first group of tokens and the set of training data further comprises copies of at least a portion of a second group of tokens in the set of groups of tokens.

In one embodiment, generating the set of training data comprises generating a data structure having a defined length; packing a first row of the data structure with the first group of tokens and the copies of at least the portion of the first group of tokens until the length of the first row of the data structure is filled up with tokens from the first group of tokens; and packing the second row of the data structure with the second group of tokens and the copies of at least the portion of the second group of tokens until the length of the second row of the data structure is filled up with tokens from the second group of tokens.

In one embodiment, the instructions further cause the at least one processing unit to determine a first set of embeddings comprising an embedding for each token in the first group of tokens and the copies of at least the portion of the first group of tokens; determine a second set of embeddings comprising an embedding for each token in the second group of tokens and the copies of at least the portion of the second group of tokens; and add the first set of embeddings to the second set of embeddings.

In one embodiment, generating the set of training data comprises repeating the copies of at least the portion of the first group of tokens and the copies of at least the portion of the second group of tokens.

In one embodiment, generating the set of training data comprises generating a data structure having a defined length; and packing the data structure with the set of groups of tokens and the copies of the at least one portion of the group of tokens in the set of groups of tokens so that a total number of tokens packed into the data structure is equal to the defined length.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A method comprising:
receiving a set of input data for training a sequence model, the set of input data comprising a sequence of tokens;
grouping the sequence of tokens into a first group of tokens and a second group of tokens, wherein tokens of the first group are correlated with one another and tokens of the second group are correlated with one another and there is no correlation between the first group and the second group;
generating a set of training data that comprises a data structure formed of multiple rows of a fixed length, the multiple rows including a token row, a position value row, and a sentence value row, wherein generating the set of training data includes:
packing the token row in the data structure by using the first group of tokens and the second group of tokens to pack alternating groups of consecutive indices in the row of the data structure until the row is filled up;
populating the position value row in the data structure with sequential indices that each identifies a positional index of a corresponding token in the token row;
populating the sentence value row in the data structure with indices that each identifies a sentence that a corresponding token in the token row belongs to; and
increasing a speed at which the sequence model is trained as compared to conventional approaches by training the sequence model using the set of training data.

2. The method of claim 1, wherein the first group of tokens are a first set of words forming a first sentence, wherein the second group of tokens are a second set of words forming a second sentence.

3. The method of claim 1, wherein grouping the sequence of tokens further comprises grouping the sequence of tokens into a third group of tokens, wherein generating the set of training data comprises using the third group of tokens to pack the alternating groups of consecutive indices and wherein packing the row of the data structure further comprises repeatedly packing the alternating groups of consecutive indices with copies of at least a portion of the first group of tokens, copies of at least a portion of the second group of tokens, and copies of at least a portion of the third group of tokens until the data structure is filled up.

4. The method of claim 1, wherein the row has a defined length and wherein generating the set of training data comprises packing the alternating groups of consecutive indices in the row with the first group of tokens, the second group of tokens, and copies of at least one portion of the first group of tokens and the second group of tokens so that a total number of tokens packed into the row of the data structure is equal to the defined length.

5. The method of claim 4 further comprising:
determining a first set of embeddings comprising an embedding for each token in the row of the data structure;

determining a second set of embeddings comprising a sentence embedding for each token in the row of the data structure; and adding the first set of embeddings and the second set of embeddings together.

6. A system comprising:

a set of processing units; and a non-transitory machine-readable medium storing instructions that when executed by at least one processing unit in the set of processing units cause the at least one processing unit to:

receive a set of input data for training a sequence model, the set of input data comprising a sequence of tokens;

group the sequence of tokens into a first group of tokens and a second group of tokens, wherein tokens of the first group are correlated with one another and tokens of the second group are correlated with one another and there is no correlation between the first group and the second group;

generate a set of training data that comprises a data structure formed of multiple rows of a fixed length, the multiple rows including a token row, a position value row, and a sentence value row, wherein generating the set of training data includes:

packing the token row in the data structure by using the first group of tokens and the second group of tokens to pack alternating groups of consecutive indices in the row of the data structure until the data structure is filled up;

populating the position value row in the data structure with sequential indices that each identifies a positional index of a corresponding token in the token row; and populating the sentence value row in the data structure with indices that each identifies a sentence that a corresponding token in the token row belongs to; and increase a speed at which the sequence model is trained as compared to conventional approaches by training the sequence model using the set of training data.

7. The system of claim 6, wherein the first group of tokens are a first set of words forming a first sentence, wherein the second group of tokens are a second set of words forming a second sentence.

8. The system of claim 6, wherein grouping the sequence of tokens further comprises grouping the sequence of tokens into a third group of tokens, wherein generating the set of training data comprises using the third group of tokens to pack the alternating groups of consecutive indices, and wherein packing the row of the data structure further comprises repeatedly packing the alternating groups of consecutive indices with copies of at least a portion of the first group of tokens, copies of at least a portion of the second group of tokens, and copies of at least a portion of the third group of tokens until the data structure is filled up.

9. The system of claim 6, wherein generating the set of training data comprises:

packing the row of the data structure with the first group of tokens and the second group of tokens and copies of at least one portion of the first group of tokens and the second group of tokens so that a total number of tokens packed into the row of the data structure is equal to a defined length of the row.

10. The system of claim 9, wherein the instructions further cause the at least one processing unit to:

determine a first set of embeddings comprising an embedding for each token in the row of the data structure;

determine a second set of embeddings comprising a sentence embedding for each token in the row of the data structure; and add the first set of embeddings and the second set of embeddings together.

11. A non-transitory machine-readable medium storing a program executable by at least one processing unit of a device, the program comprising sets of instructions for:

receiving a set of input data for training a sequence model, the set of input data comprising a sequence of tokens;

grouping the sequence of tokens into a first group of tokens and a second group of tokens, wherein tokens of the first group are correlated with one another and tokens of the second group are correlated with one another and there is no correlation between the first group and the second group;

generating a set of training data that comprises a data structure including multiple rows of a fixed length, the multiple rows including a token row, a position value row, and a sentence value row, wherein generating the set of training data includes:

packing the token row in a data structure by using the first group of tokens and the second group of tokens to pack alternating groups of consecutive indices in the row until the row is filled up; populating the position value row in the data structure with sequential indices that each identifies a positional index of a corresponding token in the token row; and populating the sentence value row in the data structure with indices that each identifies a sentence that a corresponding token in the token row belongs to; and increasing a speed at which the sequence model is trained as compared to conventional approaches by training the sequence model using the set of training data.

12. The non-transitory machine-readable medium of claim 11, wherein the first group of tokens are a first set of words forming a first sentence, wherein the second group of tokens are a second set of words forming a second sentence.

13. The non-transitory machine-readable medium of claim 11, wherein grouping the sequence of tokens further comprises grouping the sequence of tokens into a third group of tokens, wherein generating the set of training data comprises using the third group of tokens to pack the alternating groups of consecutive indices in the row, and wherein packing the row of the data structure further comprises repeatedly packing the alternating groups of consecutive indices with copies of at least a portion of the first group of tokens, copies of at least a portion of the second group of tokens, and copies of at least a portion of the third group of tokens until the data structure is filled up.

14. The non-transitory machine-readable medium of claim 11, wherein generating the set of training data comprises packing the alternating groups of consecutive indices with the first group of tokens, the second group of tokens, and copies of at least one portion of the first group of tokens and the second group of tokens so that a total number of tokens packed into the row of the data structure is equal to a defined length of the row.

* * * * *